United States Patent [19]
Saker

[11] Patent Number: 6,164,159
[45] Date of Patent: Dec. 26, 2000

[54] MOTORCYCLE FLYWHEEL ASSEMBLY

[76] Inventor: Stephan Arne Saker, 29018 Via Playa del Rey, Murrieta, Calif. 92563-6608

[21] Appl. No.: 09/256,127

[22] Filed: Feb. 24, 1999

[30] Foreign Application Priority Data

Mar. 9, 1998 [CA] Canada ................................. 2 231 608

[51] Int. Cl.⁷ .................................................... F16C 11/02
[52] U.S. Cl. ........................... 74/598; 74/597; 123/197.4; 384/457
[58] Field of Search ............................ 74/595, 596, 597, 74/598; 123/197.4; 384/457

[56] References Cited

U.S. PATENT DOCUMENTS 5,894,763  4/1999  Peters ........................................ 74/598

FOREIGN PATENT DOCUMENTS

611419  9/1926  France ................................... 384/457
323811  8/1920  Germany ............................... 384/457
364871  12/1922  Germany ............................... 384/457

*Primary Examiner*—Mary Ann Green
*Attorney, Agent, or Firm*—Davis and Bujold

[57] ABSTRACT

A motorcycle flywheel assembly which includes a fork rod and a blade rod are positioned on a common crank pin. The crank pin has threaded nut bearing end portions, non-tapered cylindrical portions adjacent the nut bearing end portion, and a central bearing surface portion. A shoulder is defined where the cylindrical portion steps down from the central bearing surface portion. The cylindrical portions of the crank pin are positioned in crank pin receiving openings of flywheels in interference fit relation with the shoulder defined where the cylindrical portion steps down from the central bearing surface portion engaging first face of each flywheel, thereby precluding flexing movement of the crank pin.

11 Claims, 6 Drawing Sheets

FIG. 7

MOTORCYCLE FLYWHEEL ASSEMBLY

FIELD OF THE INVENTION

The present invention relates to a motorcycle flywheel assembly and, in particular, a common crank pin V-twin flywheel assembly.

BACKGROUND OF THE INVENTION

HARLEY DAVIDSON (trade mark) manufactures a motor cycle that uses a V-twin engine that has an inline common crank pin V-twin flywheel assembly. In this assembly a fork rod and a blade rod share a common crank pin. The common crank pin has tapered ends that have external threads. The tapered ends are positioned in openings in weighted flywheels and secured in position by means of nuts which engage the threads on the tapered ends. The fork rod and the smaller blade rod are supported by bearings on the crank pin. At rotations per minute (rpm) in excess of 6000, the common crank experiences flexing. This flexing leads to failure of the V-twin flywheel assembly, usually bearing failure.

SUMMARY OF THE INVENTION

What is required is a modified form of an inline common crank pin V-twin flywheel assembly that is capable of performing at higher rpm.

According to the present invention there is provided a motorcycle flywheel assembly which includes two weighted flywheels in spaced apart relation. Each of the flywheels has a first face, a second face, a concentrically positioned shaft receiving opening and an eccentrically positioned crank pin receiving opening extending therethrough. A fork rod and a blade rod are positioned on a common crank pin. The crank pin has threaded nut bearing end portions, non-tapered cylindrical portions adjacent the nut bearing end portion, and a central bearing surface portion. A shoulder is defined where the cylindrical portion steps down from the central bearing surface portion. The cylindrical portions of the crank pin are positioned in the crank pin receiving openings of the flywheels in interference fit relation with the shoulder defined where the cylindrical portion steps down from the central bearing surface portion engaging first face of each flywheel, thereby precluding flexing movement of the crank pin. Nuts are secured to each of the threaded nut bearing end portions of the crank pin thereby securing the crank pin to each of the flywheels. Several roller bearing assemblies are positioned on the central bearing surface portion of the crank pin. The forked rod engages at least two of the several roller bearing assemblies. The blade rod engages at least one of the several roller bearing assemblies.

Bearing failure begins with movement in the flywheel assembly caused by vibration at high rpm. The use of non-tapered threaded ends on the crank pin positioned in interference fit relation along with a rectangular washer is intended to preclude movement. Each of the flywheels has a crank pin engaging face and an opposed face. It is preferred that the rectangular recess be positioned on the opposed face and that the crank pin be secured with a nut which is also positioned on the opposed face.

Although beneficial results may be obtained through the use of the motorcycle flywheel assembly, as described above, it is equally important that not movement occur where a shaft connects to one of the flywheels. Even more beneficial results may, therefore, be obtained when the shaft receiving opening in at least one of the flywheels has a rectangular recess. A shaft is provided having a flywheel engaging end positioned in the shaft receiving opening of the flywheel in interference fit relation. The shaft has a square plinth-like flywheel engaging end, a non-tapered cylindrical portion and a shoulder defined where the square flywheel engaging end and the cylindrical portion meet. The cylindrical portion of the shaft is positioned in the shaft receiving opening of one of the flywheels in interference fit relation. The square flywheel engaging end of the shaft is positioned in interference fit relation within the rectangular recess with the shoulder resting against the first face of the flywheel, thereby precluding flexing movement of the shaft.

Although beneficial results may be obtained through the use of the flywheel assembly, as described above, there is a weight differential between the forked rod and the blade rod. The forked rod is approximately 25% heavier than the blade rod. This weight differential contributes to vibration and bearing failure. Even more beneficial results may, therefore, be obtained when the several roller bearing assemblies consist of a central roller bearing assembly and two peripheral roller bearing assemblies positioned on either side of the central roller bearing assembly. The blade rod engages the centrally positioned roller bearing assembly. The forked rod engages the peripheral roller bearing assemblies. The peripheral roller bearing assemblies have more roller bearings than the central roller bearing assembly. It is preferred that the peripheral roller bearing assemblies have sufficient additional roller bearings as compared to the central roller bearing assembly to compensate for a difference in weight between the forked rod and the blade rod.

Although beneficial results may be obtained through the use of the flywheel assembly, as described above, an examination of a roller bearing assembly after bearing failure has occurred shows that one or more of the roller bearings have moved angle wise in the pockets in which they are positioned, so that they are not longer concentrically positioned. Bearing failure can be avoided if steps can be taken to preclude the roller bearings from moving within the pockets. Even more beneficial results may, therefore, be obtained when the roller bearing assemblies are precision guided.

Although beneficial results may be obtained through the use of the flywheel assembly, described above, where stress is placed upon a bearing assembly, metal fatigue can lead to stress fractures in the pockets that house the rollers. Even more beneficial results may, therefore, be obtained when the roller bearing assemblies have rollers disposed in pockets having radiused corners.

Although beneficial results may be obtained through the use of the flywheel assembly, described above, bearing failure can result when the rollers are deprived of lubricant. Even more beneficial results may, therefore, be obtained when the roller bearing assemblies have rollers disposed in rectangular pockets, each of the pockets having four non-planar interior sidewalls including guide portions in contact with the rollers and space between the guide portions for lubricant to communicate with the rollers.

BRIEF DESCRIPTION OF THE DRAWINGS

These and other features of the invention will become more apparent from the following description in which reference is made to the appended drawings, wherein:

FIG. 6A is an enlarged perspective view of a central roller bearing for the motorcycle flywheel assembly illustrated in FIG. 1 without any bearings, while

DETAILED DESCRIPTION OF THE PREFERRED EMBODIMENT

The preferred embodiment, a motorcycle flywheel assembly generally identified by reference numeral 10, will now be described with reference to FIGS. 1 through 7.

Figure 1:
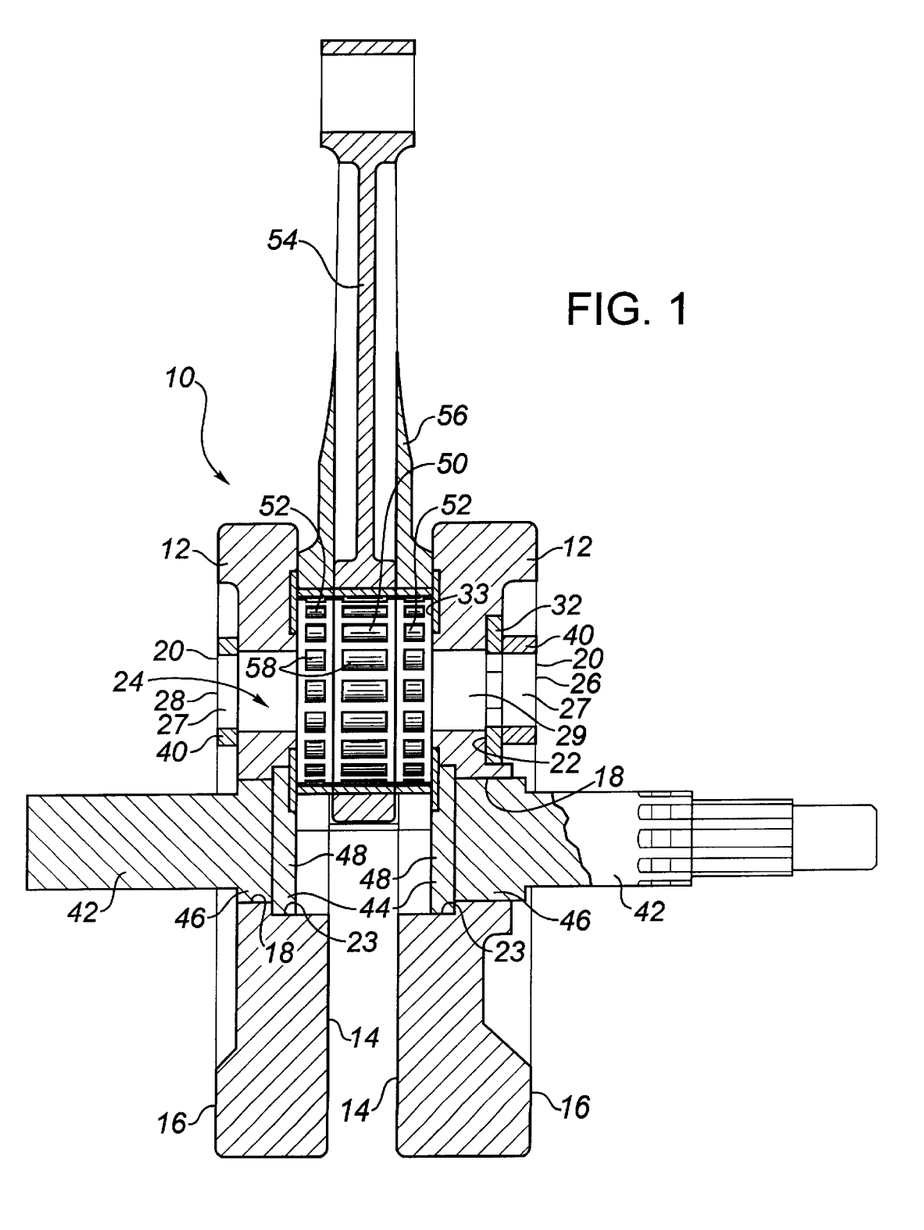
FIG. 1 is a side elevation view, in section of a motorcycle flywheel assembly constructed in accordance with the teachings of the invention.
Figure 2:
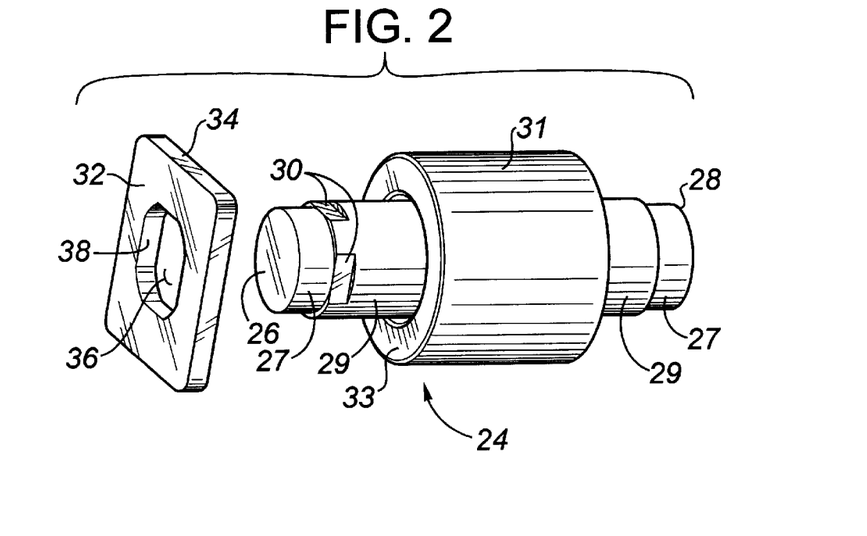
FIG. 2 is an exploded side elevation view of the crank pin from the motorcycle flywheel assembly illustrated in FIG. 1.
Figure 3:
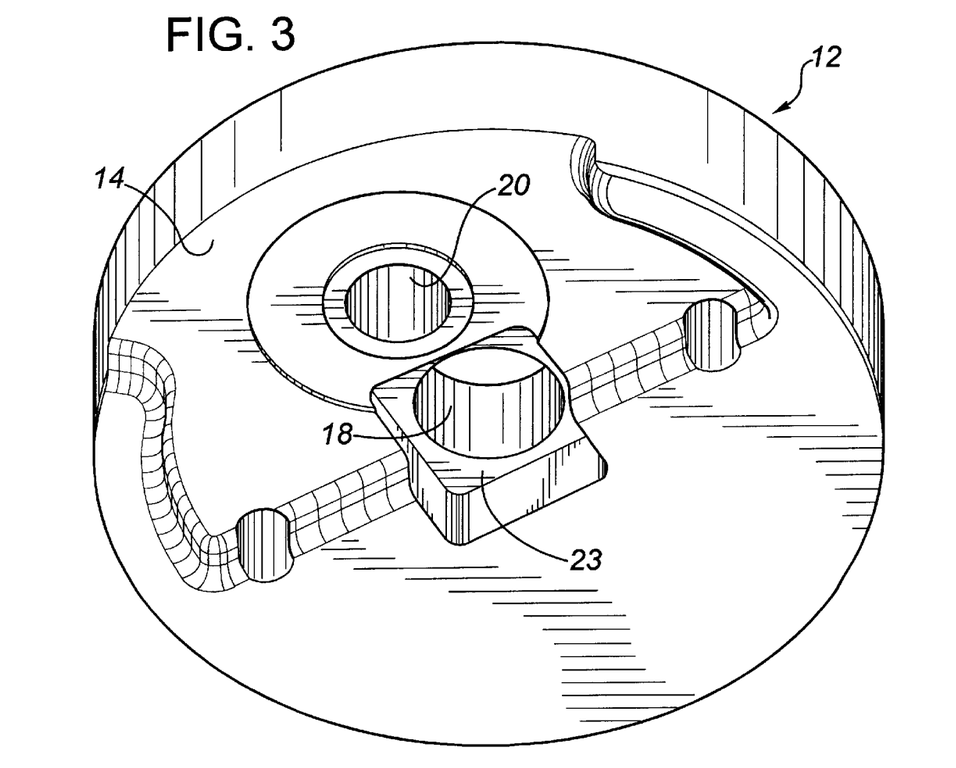
FIG. 3 is a perspective view of a flywheel from the motorcycle flywheel assembly illustrated in FIG. 1, as viewed from the crank pin engaging face.
Figure 4:
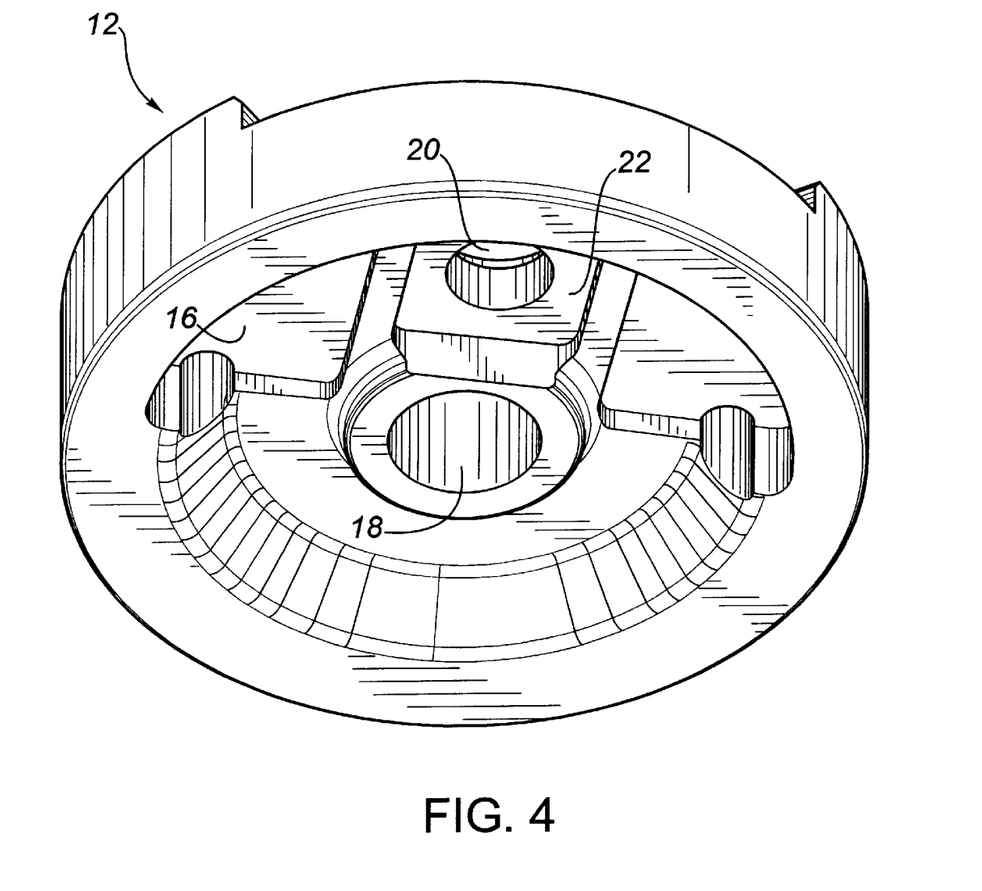
FIG. 4 is a perspective view of a flywheel from the motorcycle flywheel assembly illustrated in FIG. 1, as viewed from the opposed face.
Figure 5:
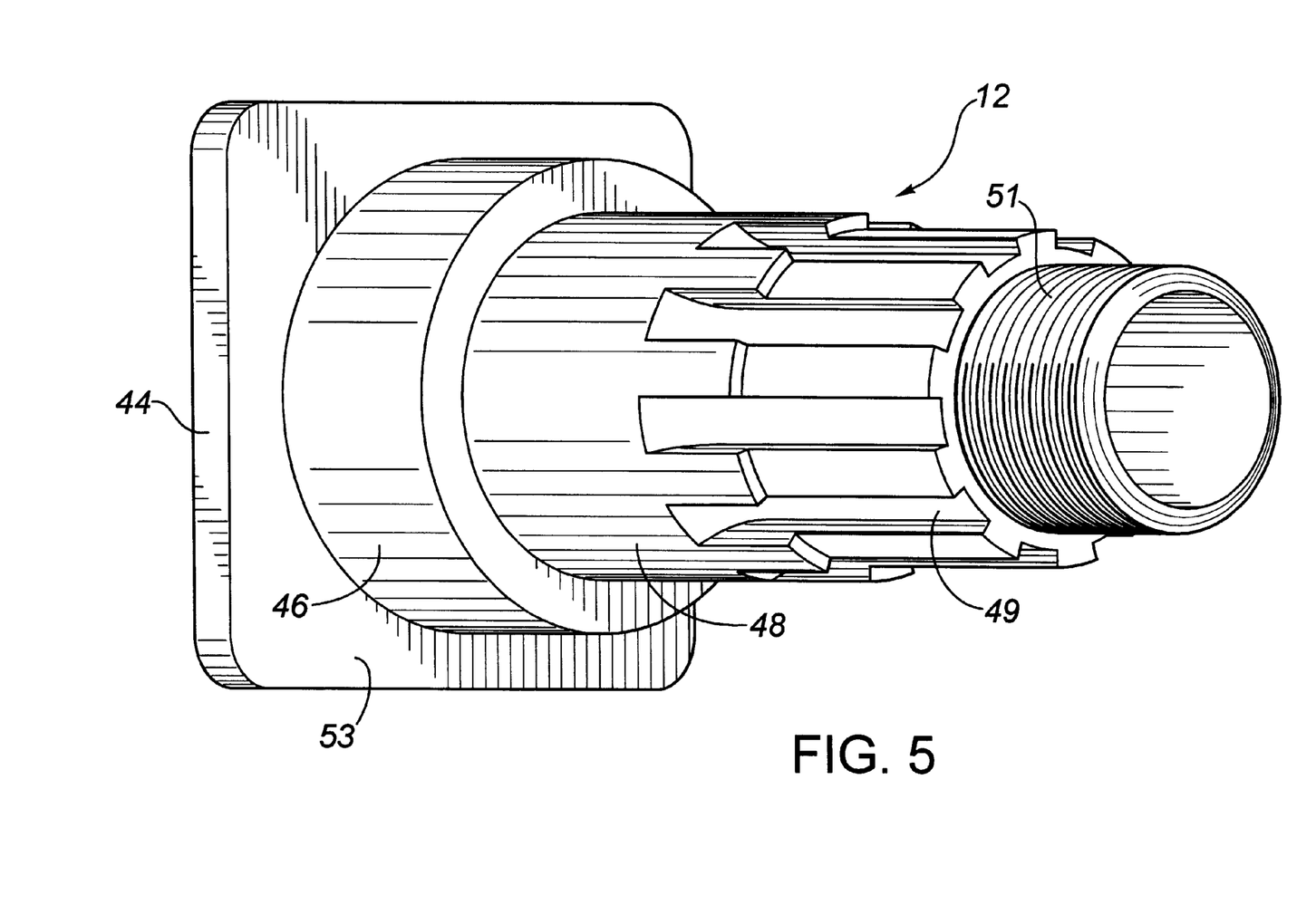
FIG. 5 is a perspective view of a driveshaft from the motorcycle flywheel assembly illustrated in FIG. 1.
Figure 6A:
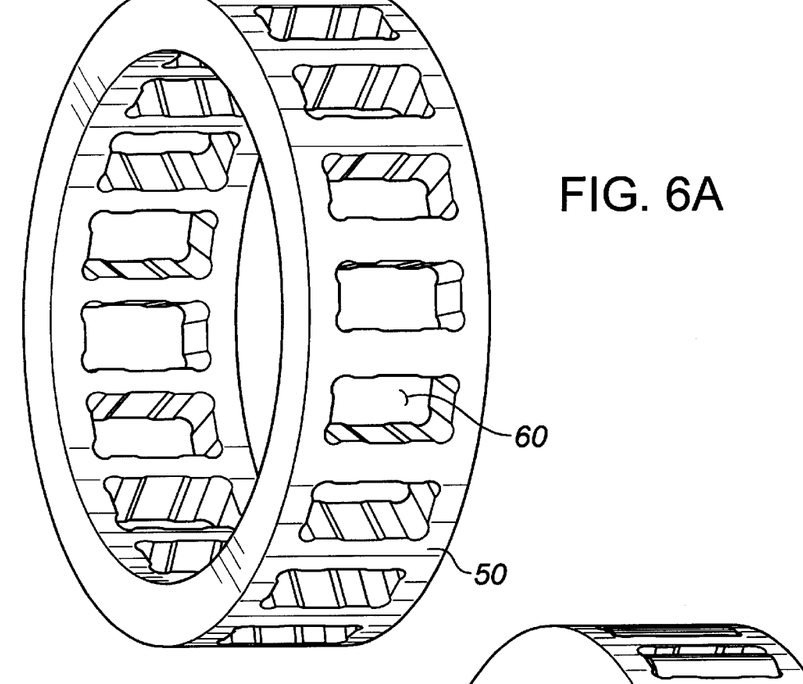
Figure 6B:
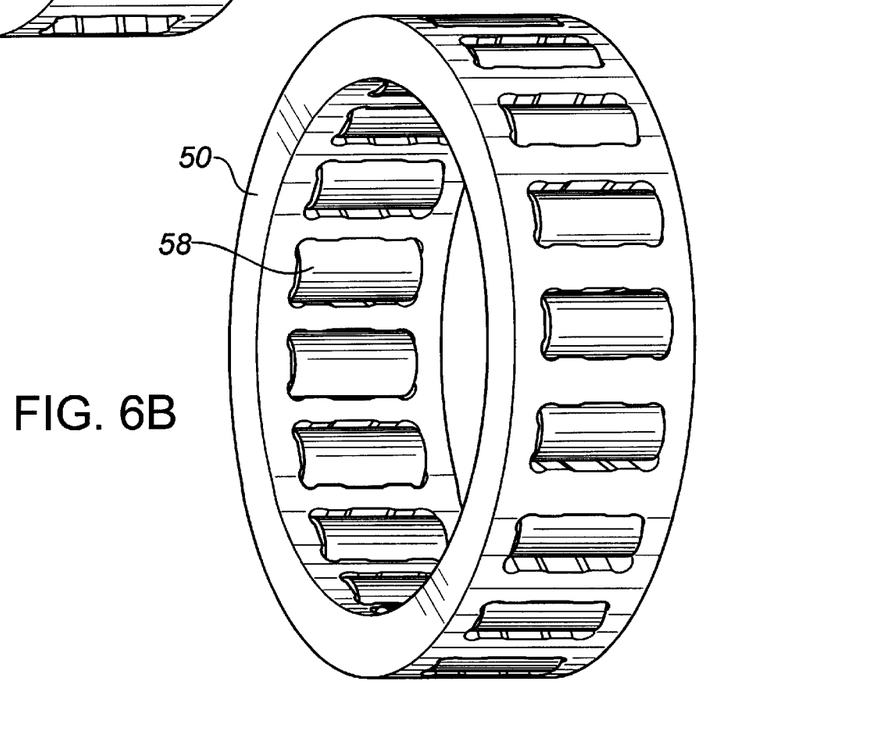
FIG. 6B is an enlarged perspective view of the central roller bearing illustrated in FIG. 1 with the bearings incorporated therein.
Figure 7:
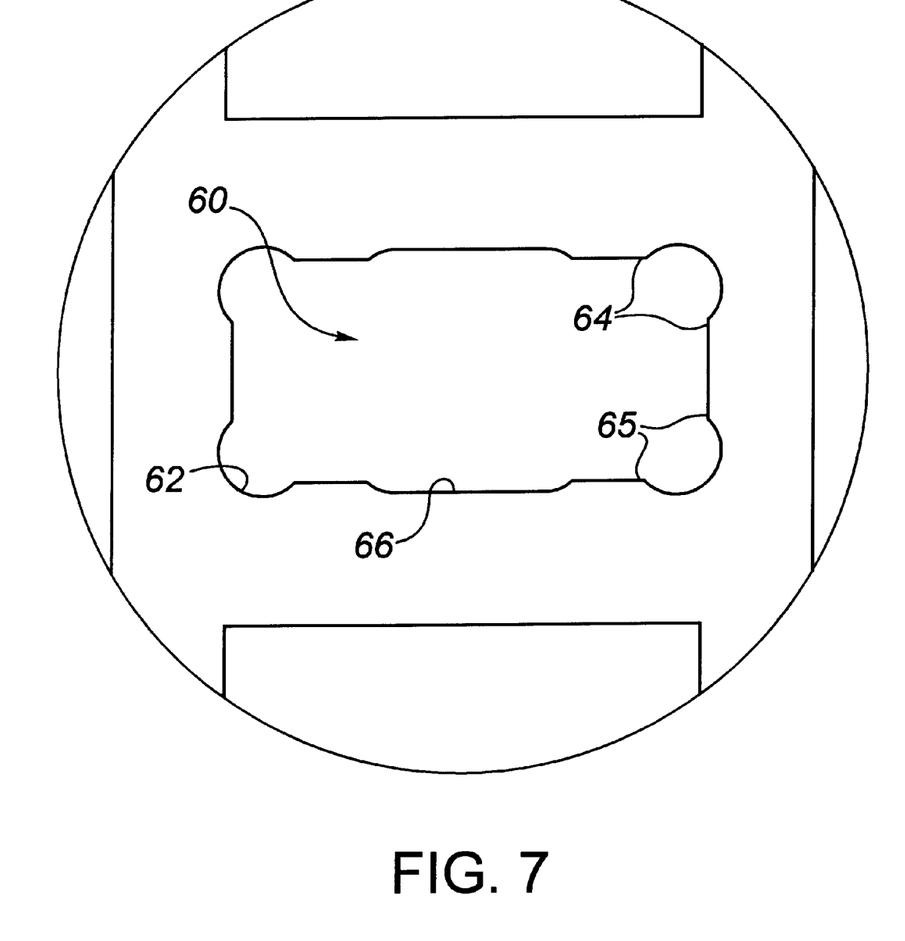
FIG. 7 is a top plan view of a pocket from the roller bearing illustrated in FIG. 6.

Referring to FIG. 1, motorcycle flywheel assembly 10 includes two weighted flywheels 12 positioned in spaced apart relation. Each of flywheels 12 has a first face 14 as illustrated in FIG. 3 and a second face 16 as illustrated in FIG. 4. Referring to FIGS. 3 and 4, each of flywheels 12 has a concentrically positioned shaft receiving opening 18 and an eccentrically positioned crank pin receiving opening 20 extending therethrough. Referring to FIG. 4, crank pin receiving opening 20 has a rectangular recess 22 on second face 16. Referring to FIG. 3, shaft receiving opening 18 has a rectangular recess 23 on first face 14. Referring to FIG. 1, a blade rod 54 and a forked rod 56 share a common crank pin 24. In the illustration a portion of forked rod 56 is hidden from view behind blade rod 54. Referring to FIG. 2, crank pin 24 has opposed ends 26 and 28. Crank pin 24 has a threaded nut bearing surface 27 at each of ends 26 and 28, a non-tapered cylindrical surface 29 immediately adjacent each nut bearing surface 27 and a central bearing supporting surface 31. Cylindrical surface 29 has flat washer engaging portions 30. There is a shoulder 33 formed by a step down between bearing supporting surface 31 and cylindrical surface 29. Referring to FIG. 1, cylindrical surfaces 29 are positioned in crank pin receiving openings 20 of flywheels 12 in interference fit relation. Referring to FIG. 2, a crank washer 32 is provided. Crank washer 32 has a square outer peripheral edge 34 and a central opening 36 with flat portions 38. Flat portions 38 of crank washer 32 engage flat washer engaging portions 30 of cylindrical surfaces 29 of crank pin 24. Referring to FIG. 1, crank washer 32 is positioned in interference fit relation in rectangular recess 22. Nuts 40 are secured to nut bearing surface 27 of each of ends 26 and 28, thereby securing crank pin 24 to each of flywheels 12. A pair of shafts 42 are provided. Referring to FIG. 5, each of shafts 42 has a square plinth-like flywheel engaging end 44 a cylindrical portion 46, and a bearing surface 48. The shaft 42 illustrated also has a sprocket pulley surface 49 and a threaded drive shaft nut bearing surface 51. A shoulder 53 is defined where square flywheel engaging end 44 of shaft 42 meets cylindrical portion 46. Referring to FIG. 1, cylindrical portion 46 of each of shafts 42 are positioned in shaft receiving opening 18 of one of flywheels 12 in interference fit relation. Square flywheel engaging end 44 of each of shafts 42 are positioned in interference fit relation within rectangular recess 23 surrounding shaft receiving opening 18 on first face 14 of flywheels 12. A central roller bearing assembly 50 and two peripheral roller bearing assemblies 52 are positioned on crank pin 24. Peripheral roller bearing assemblies 52 are positioned on either side of central roller bearing assembly 50. Blade rod 54 engages centrally positioned roller bearing assembly 50. Forked rod 56 engages each of peripheral roller bearing assemblies 52. Peripheral roller bearing assemblies 52 have more rollers 58 than central roller bearing assembly 50. Peripheral roller bearing assemblies 52 have sufficient additional rollers 58 as compared to central roller bearing assembly 50 to compensate for a difference in weight between forked rod 56 and blade rod 54. As forked rod 56 is generally 25% heavier than blade rod 54, peripheral roller bearing assemblies 52 should have 25% more bearings than central roller bearing assembly 50. Referring to FIGS. 6A and 6B, rollers 58 (for both roller bearing assemblies 50 and 52) are disposed in rectangular pockets 60. Referring to FIG. 7, pockets 60 have radiused corners 62. Radiused corners 62 are provided for strength and to prevent stress cracks from forming in the corners of pockets 60. Each of pockets 60 has four non-planar interior sidewalls 64. The non-planar nature of the interior sidewalls 64 serves several functions. Firstly, only guide portions 65 of each interior sidewall is in contact with rollers 58. This reduces friction, there is only sufficient contact to guide and maintain the correct positioning of rollers 58. Secondly, the non-planar nature of interior sidewalls 64 leaves gaps or spaces 66 for oil to reach rollers 58 to cool and lubricate them during operation.

The use and operation of motorcycle flywheel assembly 10 will now be described with reference to FIGS. 1 through 5. Referring to FIG. 1, cylindrical portion 46 of each of shafts 42 are positioned in shaft receiving opening 18 of one of flywheels 12 in interference fit relation. Square flywheel engaging end 44 of each of shafts 42 are positioned in interference fit relation within rectangular recess 23 surrounding shaft receiving opening 18 on first face 14 of flywheels 12. This effectively precludes any movement of shaft 42. When shaft 42 is in position, shoulder 53 rests against first face 14 of flywheel 12. This serves as an "anti-leverage" surface. Shoulder 53 is made as large as possible. It is preferred that the periphery be a minimum of one quarter of an inch in width. Force that would tend to flex or rotate shaft 42 are resisted by square flywheel engaging end 44, shoulder 53, along with the interference fit. Crank pin is similarly secured to flywheel 12. Cylindrical surfaces 29 of crank pin 24 are positioned in crank pin receiving openings 20 of flywheels 12 in interference fit relation. Crank washer 32 is placed onto crank pin 24 with flat portions 38 of crank washer 32 engaging flat washer engaging portions 30 of cylindrical surfaces 29 of crank pin 24. Crank washer 32 is positioned in interference fit relation in rectangular recess 22 of flywheel 12. Shoulder 33 engages first face 14 of flywheel 12. Shoulder 33 also serves as an "anti-leverage" surface. Shoulder 33 is also made as large as possible, and has a preferred periphery of a minimum of one quarter of an inch in width. The forces that would tend to flex crank pin 24 are resisted by square crank washer 32 and shoulder 33. The force would almost have to be sufficient to bend flywheel 12 before it would bend or cause flexing of crank pin 24. It is possible to build crank washer 32 into flywheel 12, rather than maintain it as a separate component. In order to do so, anti-rotation means to engage flat portions 30 of crank pin 24 would have to be machined into crank pin receiving openings 20. In the prior art, flexing of the crank pin was anticipated. The manufacturers were forced to manufacture the bearings to tolerances that would allow some limited movement of the bearings in response to flexing of the crank pin. With the configuration described above in which the flexing is practically eliminated, it is preferred that the manufacturing tolerances in roller bearing assemblies 50 and 52 be made more precise, so that the rollers are precision guided. Beneficial results have been obtained with roller bearing assemblies that are manufactured to tolerances one or two ten thousandths of an inch. As described above, a weight imbalance between forked rod 56 and blade rod 54 that previously lead to movement in the flywheel assembly is compensated for through modifications to the roller bearing assemblies. Roller bearing assemblies 50 and 52 are also modified for high performance. Referring to FIG. 7, radiused corners 62 prevent stress cracks from forming in the corners of pockets 60. The non-planar nature of interior sidewalls 64 of pockets 60 reduces friction between interior sidewalls 64 and rollers 58, while leaving gaps or spaces 66 for oil to reach rollers 58 to cool and lubricate them during operation. It is preferred that rollers 58 be made as large as possible to withstand a high performance power stroke.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A motorcycle flywheel assembly, comprising:

two weighted flywheels in spaced apart relation, each of the flywheels having a first face, a second face, a concentrically positioned shaft receiving opening and an eccentrically positioned crank pin receiving opening extending therethrough;

a forked rod and a blade rod positioned on a common crank pin, the crank pin having threaded nut bearing end portions, non-tapered cylindrical portions adjacent the nut bearing end portion, and a central bearing surface portion, shoulders are defined where the cylindrical portions step down from the central bearing surface portion;

the cylindrical portions of the crank pin are positioned in the crank pin receiving openings of the flywheels in interference fit relation with the shoulders defined where the cylindrical portions step down from the central bearing surface portion engaging the first face of each flywheel, thereby precluding flexing movement of the crank pin;

nuts secured to each of the threaded nut bearing end portions of the crank pin thereby securing the crank pin to each of the flywheels;

several roller bearing assemblies positioned on the central bearing surface portion of the crank pin;

the forked rod engaging at least two of the several roller bearing assemblies; and the blade rod engaging at least one of the several roller bearing assemblies; a rectangular recess frames the shaft receiving opening in the first face of at least one of the flywheels; a shaft is provided that has a square flywheel engaging end, a non-tapered cylindrical portion and a shoulder defined where the square flywheel engaging end and the cylindrical portion meet, the cylindrical portion of the shaft being positioned in the shaft receiving opening of one of the flywheels in interference fit relation, the square flywheel engaging end of the shaft being positioned in interference fit relation within the rectangular recess with the shoulder resting against the first face of the flywheel, thereby precluding flexing movement of the shaft.

2. The flywheel assembly as defined in claim 1, wherein the crank pin has non-rotational locking portions and means are provided in the vicinity of the crank pin receiving openings for engaging the non-rotational locking portions thereby precluding rotational movement of the crank pin.

3. The flywheel assembly as defined in claim 2, wherein a rectangular recess frames the crank pin opening in the second face of at least one of the flywheels; and a crank washer is provided with a square outer peripheral edge positioned in interference fit relation in the rectangular recess, the crank washer having a central opening with flat portions that engage the flat washer engaging non-rotational locking portions of the crank pin, thereby precluding rotational movement of the crank pin.

4. The flywheel assembly as defined in claim 1, wherein the roller bearing assemblies are precision guided.

5. The flywheel assembly as defined in claim 1, wherein the several roller bearing assemblies consist of a central roller bearing assembly and two peripheral roller bearing assemblies positioned on either side of the central roller bearing assembly, the blade rod engaging the centrally positioned roller bearing assembly and the forked rod engaging the peripheral roller bearing assemblies, the peripheral roller bearing assemblies having more roller bearings than the central roller bearing assembly.

6. The flywheel assembly as defined in claim 5, wherein the peripheral roller bearing assemblies have sufficient additional roller bearings as compared to the central roller bearing assembly to compensate for a difference in weight between the forked rod and the blade rod.

7. The flywheel assembly as defined in claim 1, wherein the roller bearing assemblies have rollers disposed in pockets having radiused corners.

8. The flywheel assembly as defined in claim 1, wherein the roller bearing assemblies have rollers disposed in rectangular pockets, a majority of the pockets having at least one non-planar interior sidewall including guide portions in contact with the rollers and space between the guide portions for lubricant to communicate with the rollers.

9. A motorcycle flywheel assembly, comprising:

two weighted flywheels in spaced apart relation, each of the flywheels having a first face, a second face, a concentrically positioned shaft receiving opening and an eccentrically positioned crank pin receiving opening extending therethrough, a rectangular recess frames the crank pin opening in the second face of at least one of the flywheels, a rectangular recess frames the shaft receiving opening in the first face of at least one of the flywheels;

a forked rod and a blade rod positioned on a common crank pin, the crank pin having threaded nut bearing end portions, non-tapered cylindrical portions adjacent the nut bearing end portion, and a central bearing surface portion, a shoulder is defined where the cylindrical portions step down from the central bearing surface portion, the crank pin having flat washer engaging non-rotational locking flat portions on the cylindrical portion;

the cylindrical portions of the crank pin are positioned in the crank pin receiving openings of the flywheels in interference fit relation with the shoulder defined where the cylindrical portions step down from the central bearing surface portion engaging the first face of each flywheel, thereby precluding flexing movement of the crank pin;

nuts secured to each of the threaded nut bearing end portions of the crank pin thereby securing the crank pin to each of the flywheels;

several roller bearing assemblies positioned on the central bearing surface portion of the crank pin;

the forked rod engaging at least two of the several roller bearing assemblies; and the blade rod engaging at least one of the several roller bearing assemblies;

a crank washer with a square outer peripheral edge positioned in interference fit relation in the rectangular recess, the crank washer having a central opening with flat portions that engage the flat washer engaging non-rotational locking flat portions of the crank pin, thereby precluding rotational movement of the crank pin;

a shaft is provided that has a square flywheel engaging end, a non-tapered cylindrical portion and a shoulder defined where the square flywheel engaging end and the cylindrical portion meet, the cylindrical portion of the shaft being positioned in the shaft receiving opening of one of the flywheels in interference fit relation, the square flywheel engaging end of the shaft being positioned in interference fit relation within the rectangular recess with the shoulder resting against the first face of the flywheel, thereby precluding flexing movement of the shaft; and the several roller bearing assemblies consist of a central roller bearing assembly and two peripheral roller bearing assemblies positioned on either side of the central roller bearing assembly, the blade rod engaging the centrally positioned roller bearing assembly and the forked rod engaging the peripheral roller bearing assemblies, the peripheral roller bearing assemblies having more roller bearings than the central roller bearing assembly, the peripheral roller bearing assemblies have sufficient additional roller bearings as compared to the central roller bearing assembly to compensate for a difference in weight between the forked rod and the blade rod.

10. The flywheel assembly as defined in claim 9, wherein the roller bearing assemblies have rollers disposed in rectangular pockets having radiused corners and non-planar interior sidewalls, the non-planar interior sidewalls including guide portions in contact with the rollers and space between the guide portions for lubricant to communicate with the rollers.

11. The flywheel assembly as defined in claim 9, wherein the roller bearing assemblies are precision guided.

* * * * *